(12) United States Patent
Obara

(10) Patent No.: US 11,551,710 B1
(45) Date of Patent: Jan. 10, 2023

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventor: Yoshifumi Obara, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/652,193

(22) Filed: Feb. 23, 2022

(30) Foreign Application Priority Data

Jun. 17, 2021 (JP) .............................. JP2021-100874

(51) Int. Cl.
*G11B 20/10* (2006.01)
*G11B 5/012* (2006.01)

(52) U.S. Cl.
CPC ........ *G11B 5/012* (2013.01); *G11B 20/10268* (2013.01)

(58) Field of Classification Search
CPC ....... G11B 15/087; G11B 20/06; G11B 20/08; G11B 20/10268; G11B 27/36; G11B 5/09; G11B 20/10; G11B 20/12
USPC ............................ 360/28, 29, 31, 39, 40, 48
See application file for complete search history.

(56) References Cited

U.S. PATENT DOCUMENTS

| 6,021,012 A | 2/2000 | Bang |
| 6,754,019 B2 | 6/2004 | Tokizono et al. |
| 7,054,083 B2 * | 5/2006 | Ehrlich ............. G11B 5/59655 360/48 |
| 7,583,470 B1 | 9/2009 | Chen et al. |
| 8,711,507 B1 | 4/2014 | Katchmart |
| 10,748,569 B1 | 8/2020 | Ogawa et al. |

* cited by examiner

*Primary Examiner* — Nabil Z Hindi
(74) *Attorney, Agent, or Firm* — Knobbe, Martens, Olson & Bear, LLP

(57) ABSTRACT

According to an embodiment, a magnetic disk has a plurality of second servo sectors and a plurality of third servo sectors each arranged between two second servo sectors of the plurality of second servo sectors, in which the second and third servo sectors are arranged in a circumferential direction. A controller performs a first demodulation for detecting a servo mark and demodulating a burst pattern on the servo data in each second servo sector. The controller performs a second demodulation for demodulating the burst pattern without detecting the servo mark, on the servo data in each third servo sector. The controller performs the second demodulation on the servo data in a fourth servo sector which is one of the plurality of second servo sectors in a case where the detection of the servo mark fails when the first demodulation is performed on the servo data in the fourth servo sector.

20 Claims, 12 Drawing Sheets

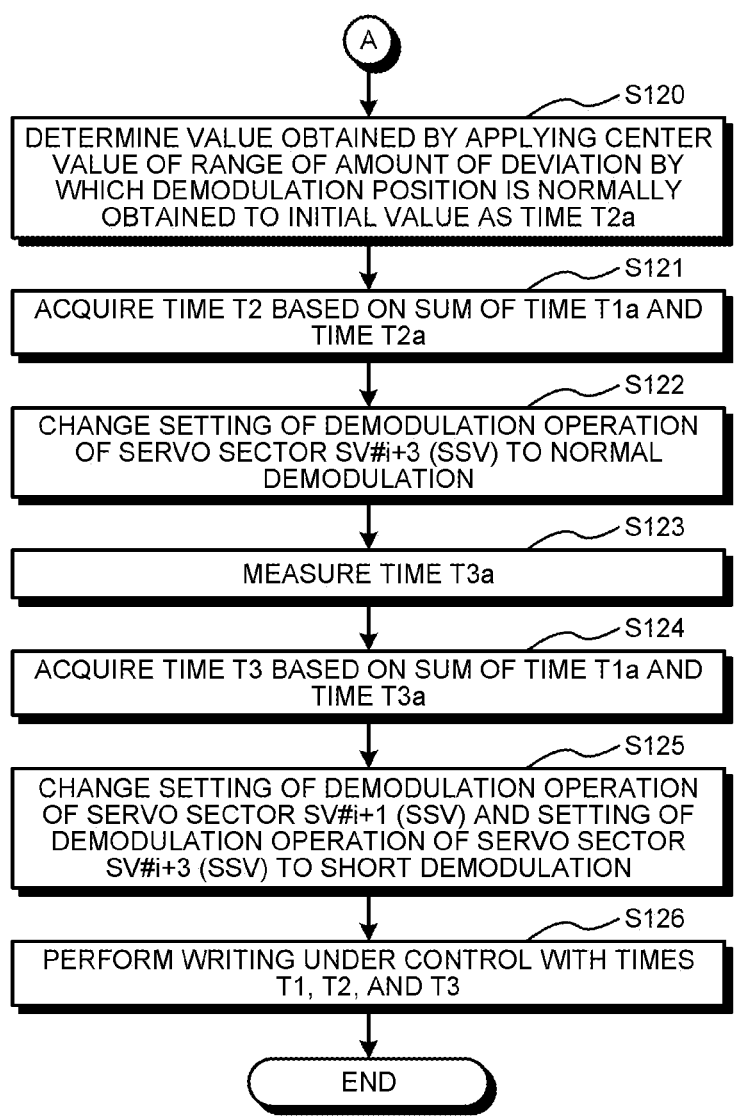

MAGNETIC DISK DEVICE AND METHOD

CROSS-REFERENCE TO RELATED APPLICATIONS

This application is based upon and claims the benefit of priority from Japanese Patent Application No. 2021-100874, filed on Jun. 17, 2021; the entire contents of which are incorporated herein by reference.

FIELD

Embodiments described herein relate generally to a magnetic disk device and method.

BACKGROUND

A magnetic disk included in a magnetic disk device has servo sectors in which servo data is written, which are arranged at intervals in a circumferential direction. When writing to the magnetic disk, the magnetic disk device acquires position information representing the present position of a magnetic head by demodulating servo data, and controls the position of the magnetic head based on the acquired position information.

The servo data includes a servo mark and a burst pattern. The servo mark is data representing the start of servo data. The burst pattern is data for detecting the offset amount of the position of the magnetic head from a track center.

The magnetic disk device uses the detection of the servo mark in order to determine the timing for demodulating a burst pattern written in rear of the servo mark. If the detection of the servo mark fails, the magnetic disk device cannot demodulate the burst pattern written in rear of the servo mark, and thus the positioning accuracy of the magnetic head deteriorates.

BRIEF DESCRIPTION OF THE DRAWINGS

FIG. 11B is a flowchart illustrating the operation of the magnetic disk device of the embodiment.

DETAILED DESCRIPTION

According to the present embodiment, the magnetic disk device includes a magnetic disk, a magnetic head, and a controller. The magnetic disk has a plurality of first servo sectors in which servo data is written, which is arranged at intervals in a circumferential direction. The servo data includes a servo mark and a burst pattern written in rear of the servo mark in the write/read direction along the circumferential direction. The plurality of first servo sectors includes a plurality of second servo sectors, and a plurality of third servo sectors each arranged between two second servo sectors of the plurality of second servo sectors. The magnetic head performs write/read of data to and from the magnetic disk in the write/read direction. The controller is configured to perform a first demodulation on the servo data written in each of the plurality of second servo sectors. The first demodulation is an operation of detecting the servo mark and demodulating the burst pattern. The controller is configured to perform a second demodulation on the servo data written in each of the plurality of third servo sectors. The second demodulation is an operation of demodulating the burst pattern without detecting the servo mark. The controller is configured to perform the second demodulation on the servo data written in a fourth servo sector in a first case where the detection of the servo mark has failed when the first demodulation is performed on the servo data written in the fourth servo sector. The fourth servo sector is one of the plurality of second servo sectors.

The magnetic disk device and method according to the embodiment will be described below in detail with reference to the accompanying drawings. Note that the present invention is not limited to the present embodiment.

Embodiment

Figure 1:
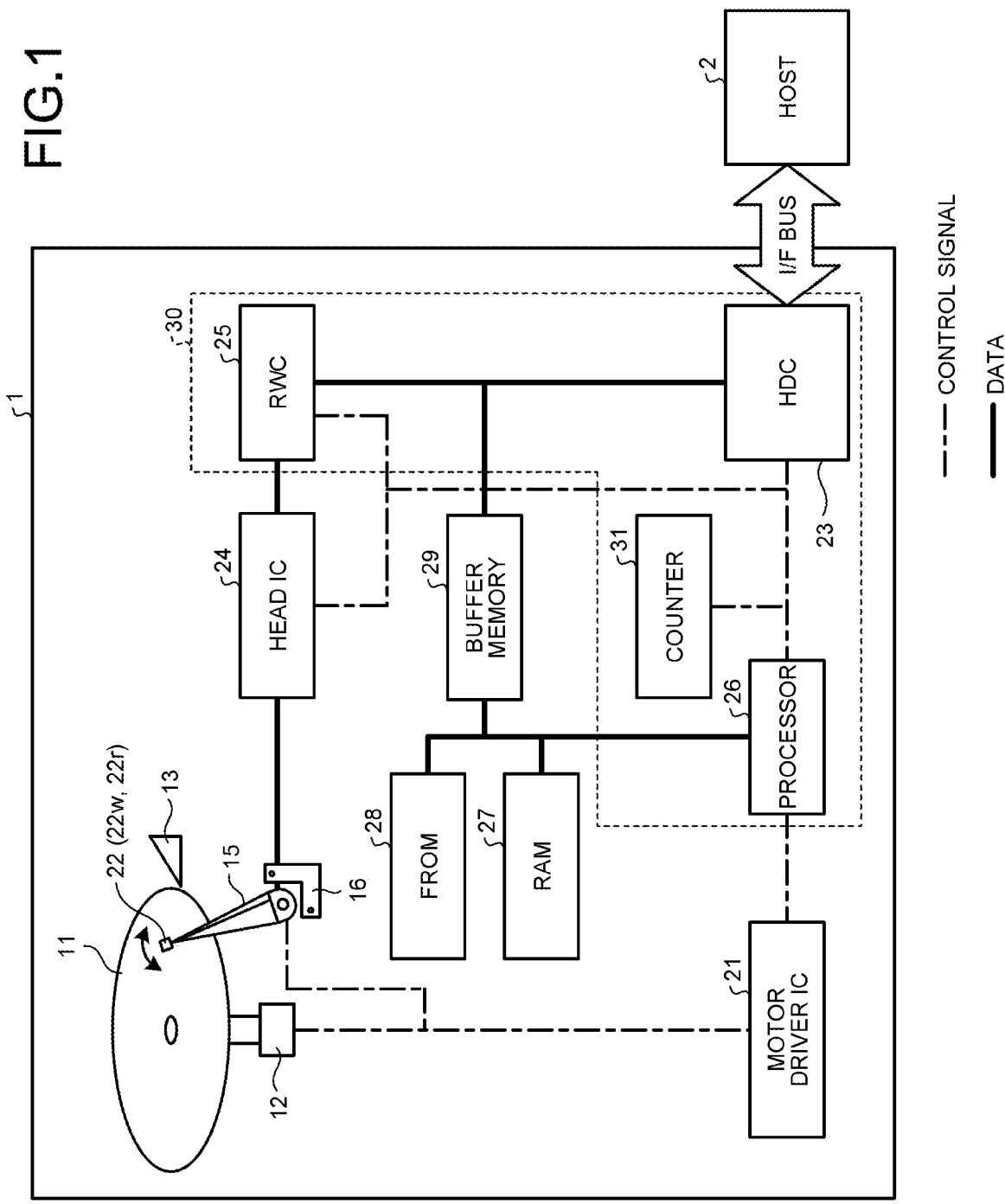
FIG. 1 is a schematic diagram illustrating an example of a configuration of a magnetic disk device of an embodiment.

FIG. 1 is a schematic diagram illustrating an example of a configuration of a magnetic disk device 1 of the embodiment.

The magnetic disk device 1 is connectable to a host 2. The magnetic disk device 1 receives access commands such as a write command and a read command from the host 2.

The magnetic disk device 1 includes a magnetic disk 11 having a magnetic layer formed on its surface. The magnetic disk device 1 writes data to the magnetic disk 11 or reads data from the magnetic disk 11 according to an access command.

Data is written and read via a magnetic head 22. Specifically, the magnetic disk device 1 includes, in addition to the magnetic disk 11, a spindle motor 12, a ramp 13, an actuator arm 15, a voice coil motor (VCM) 16, a motor driver integrated circuit (IC) 21, a magnetic head 22, a hard disk controller (HDC) 23, a head IC 24, a read/write channel (RWC) 25, a processor 26, a RAM 27, a flash read only memory (FROM) 28, a buffer memory 29, and a counter 31.

The magnetic disk 11 is rotated at a predetermined rotational speed by the spindle motor 12 mounted coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 by a write core 22w and a read core 22r provided therein. The magnetic head 22 is mounted to a tip of the actuator arm 15. The magnetic head 22 is moved in the radial direction of the magnetic disk 11 by the VCM 16 driven by the motor driver IC 21. A plurality of write cores 22w and/or read cores 22r provided in the magnetic head 22 may be provided for a single magnetic head 22.

For example, when the rotation of the magnetic disk 11 is stopped, the magnetic head 22 is moved on the ramp 13. The ramp 13 is configured to hold the magnetic head 22 at a position separated from the magnetic disk 11.

In a read operation, the head IC 24 amplifies a signal read from the magnetic disk 11 by the magnetic head 22, outputs the amplified signal, and supplies the amplified signal to the RWC 25. In a write operation, the head IC 24 amplifies a signal corresponding to data to be written supplied from the RWC 25 and supplies the amplified signal to the magnetic head 22.

The HDC 23 controls data transmission and reception to and from the host 2 via an I/F bus, controls the buffer memory 29, and performs error correction processing on the read data.

The buffer memory 29 is used as a buffer for data transmitted and received to and from the host 2. For example, the buffer memory 29 is used for temporarily storing data to be written or data read from the magnetic disk 11.

The buffer memory 29 is constituted of, for example, a volatile memory capable of high-speed operation. The kind of memory constituting the buffer memory 29 is not limited to a specific kind. The buffer memory 29 may be constituted of, for example, a dynamic random access memory (DRAM), a static random access memory (SRAM), or a combination thereof. The buffer memory 29 may be constituted of any kind of a nonvolatile memory.

The RWC 25 modulates data to be written supplied from the HDC 23 and supplies the modulated data to the head IC 24. The RWC 25 demodulates a signal read from the magnetic disk 11 and supplied from the head IC 24 and outputs the demodulated signal as digital data to the HDC 23.

The processor 26 is, for example, a central processing unit (CPU). The processor 26 is connected with the RAM 27, the flash read only memory (FROM) 28, the buffer memory 29, and the counter 31.

The FROM 28 is a nonvolatile memory. The FROM 28 stores firmware (program data) and various operation parameters, for example. The firmware may be stored in the magnetic disk 11.

The RAM 27 is constituted of, for example, DRAM, SRAM, or a combination thereof. The RAM 27 is used by the processor 26 as a memory for operation. The RAM 27 is used as an area where firmware is loaded and an area where various kinds of management data are temporarily stored.

The processor 26 performs overall control of the magnetic disk device 1 according to the firmware stored in the FROM 28 or the magnetic disk 11. For example, the processor 26 loads firmware from the FROM 28 or the magnetic disk 11 into the RAM 27 and controls, for example, the motor driver IC 21, the head IC 24, the RWC 25, the HDC 23 according to the loaded firmware.

The counter 31 is a timer circuit in which a count value increases with time. The processor 26 uses the counter 31 to determine the timing of various operations. The kind of the counter 31 is not limited to a specific kind. In one example, the counter 31 may be a voltage-controlled oscillator (VCO) counter. A specific usage of the counter 31 will be described below.

The configuration including the HDC 23, the RWC 25, the processor 26, and the counter 31 may also be considered a controller 30. In addition to these components, the controller 30 may include other components (e.g., the RAM 27, the FROM 28, or the buffer memory 29). The counter 31 may be provided outside the controller 30.

The firmware program may be stored in the magnetic disk 11. Some or all of the functions of the processor 26 may be implemented by a hardware circuit, such as a field-programmable gate array (FPGA) or an application specific integrated circuit (ASIC).

Figure 2:
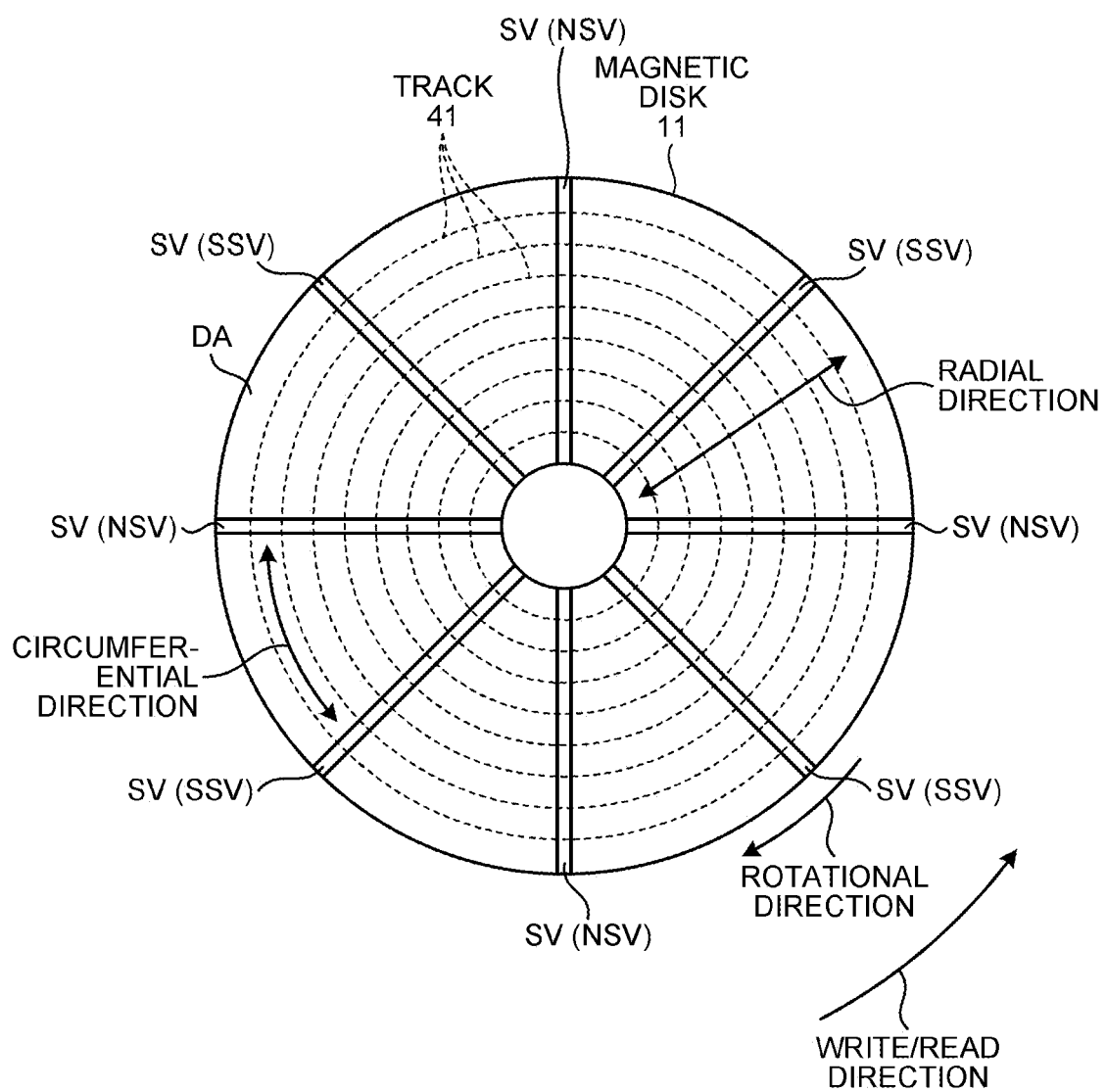
FIG. 2 is a schematic diagram illustrating an example of a configuration of a magnetic disk of the embodiment.

FIG. 2 is a schematic diagram illustrating an example of the configuration of the magnetic disk 11 of the embodiment. FIG. 2 illustrates an example of the rotational direction of the magnetic disk 11. The magnetic head 22 is moved relative to the magnetic disk 11 by the rotation of the magnetic disk 11. Therefore, the write/read direction, that is, the direction in which data is written or read by the magnetic head 22 along the circumferential direction, is the opposite direction of the rotational direction of the magnetic disk 11.

In a manufacturing process, servo data used for positioning the magnetic head 22 is written in the magnetic disk 11 by, for example, a servo writer or by a self-servo-write (SSW). FIG. 2 depicts a plurality of servo areas SV arranged radially in the radial direction and at predetermined intervals in the circumferential direction as an example of the arrangement of servo areas in which servo data is written. A data area DA in which data is written is arranged between two servo areas SV continuous in the circumferential direction.

The plurality of servo areas SV includes a plurality of normal servo areas NSV and a plurality of short servo areas SSV. According to the example illustrated in FIG. 2, the normal servo areas NSV and the short servo areas SSV are alternately arranged in the circumferential direction. In other words, one short servo area SSV is arranged between two normal servo areas NSV arranged continuously in the circumferential direction.

A plurality of concentric tracks 41 is provided in the radial direction of the magnetic disk 11. In the data area DA, a plurality of data sectors is continuously formed along each track 41. The servo data written in the servo area SV is used to position the read core 22r or the write core 22w of the magnetic head 22 on the targeted track 41. In the state where the read core 22r or the write core 22w are positioned on the targeted track 41, user data is written or read to the targeted data sector.

An area divided by the normal servo area NSV on a track 41 is hereinafter denoted as a normal servo sector NSV. An area divided by the short servo area SSV on a track 41 is denoted as a short servo sector SSV. The normal servo sector NSV and the short servo sector SSV are collectively referred to as a servo sector SV.

Figure 3:
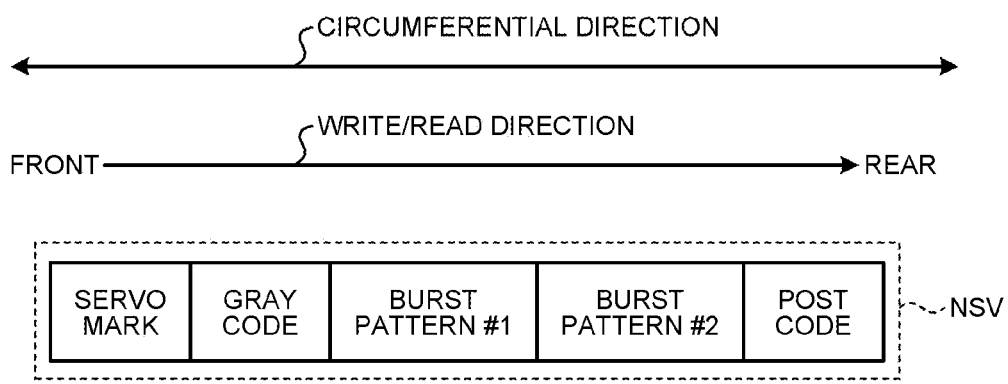
FIG. 3 is a diagram illustrating an example of servo data written in a normal servo sector of the embodiment.

FIG. 3 is a diagram illustrating an example of servo data written in a normal servo sector NSV of the embodiment. In this example, a servo mark, gray code, burst pattern #1, burst pattern #2, and post code are written in the write/read direction in a normal servo sector NSV in this order.

When a first data and a second data are written along the write/read direction and the first data is written in an area to be read earlier than the second data, the direction toward the area of the first data viewed from the area where the second data is written may be denoted as "before" or "in front of" the area where the second data is written. On the other hand, the direction toward the area of the second data viewed from the area where the first data is written may be denoted as "after" or "in rear of" the area where the first data is written. In the case where it is denoted as the "second area immediately before" or the "second area arranged immediately before" when attention is focused on the first area, it is assumed that the "second area immediately before" and the "second area arranged immediately before" refer to the second area through which the magnetic head 22 last passes before the magnetic head 22 passes through the first area. In the case where it is denoted as the "second area immediately after" or the "second area arranged immediately after" when the attention is focused on the first area, it is assumed that the "second area immediately after" and the "second area arranged immediately after" refer to the second area through which the magnetic head 22 first passes after the magnetic head 22 passes through the first area.

The servo mark indicates the start of servo data. The gray code includes an ID for identifying each track 41 provided on the magnetic disk 11, that is, a track number, and an ID for identifying each servo sector SV on the track 41, that is, a servo sector number. A servo sector SV having a servo sector number x (where x is an integer of 0 or more) may be hereinafter denoted as a servo sector SV #x.

The burst pattern #1 and the burst pattern #2 are data used for detecting an amount of positional deviation of a track indicated by a track number included in the gray code from the center. The track number included in the gray code is given, for example, as an integer value, and an offset amount below a decimal point based on the position indicated by the track number can be obtained by demodulating the burst pattern #1 and the burst pattern #2. In other words, the present position of the magnetic head 22 is obtained by demodulating the burst pattern #1 and the burst pattern #2. The present position of the magnetic head 22 is the position of the magnetic head 22 on the magnetic disk 11 at the timing at which the servo data is demodulated. The present position of the magnetic head 22 obtained by demodulating the burst pattern #1 and the burst pattern #2 is denoted as a demodulation position.

The burst pattern #1 and the burst pattern #2 are composed of, for example, a repeating pattern of a predetermined cycle. The phase of the burst pattern #1 and the phase of the burst pattern #2 are written so as to differ from each other by 90 degrees in the radial direction. The configuration of each burst pattern #1 and burst pattern #2 is not limited to the above configuration. In this figure, two types of burst patterns #1 and #2 are arranged in the write/read direction. The number of types of burst patterns arranged in the write/read direction is not limited to two. Three or more types of burst patterns may be arranged in the write/read direction.

The post code is data for correcting the positional deviation of the shape of the track 41 defined by the gray code, the burst pattern #1, and the burst pattern #2 from the shape of the ideal track 41. The degree of the positional deviation varies in synchronization with the rotation of the magnetic disk 11. Therefore, the positional deviation is also referred to as Repeatable RunOut (RRO). In other words, the post code is data for correcting the RRO.

Figure 4:
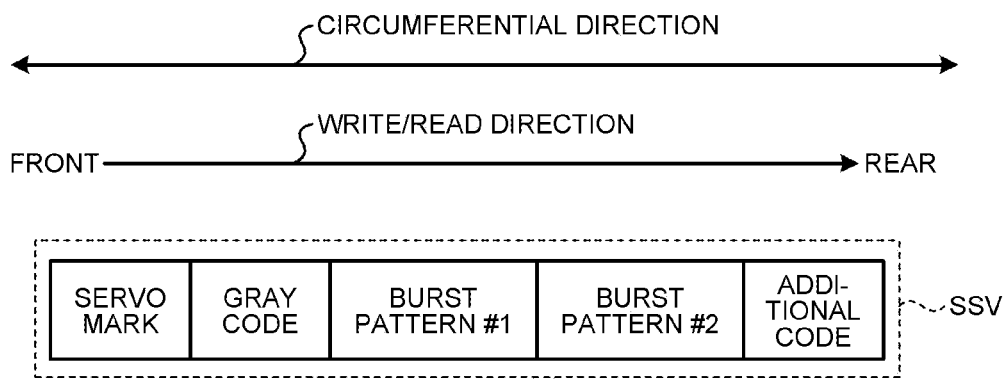
FIG. 4 is a diagram illustrating an example of servo data written in a short servo sector of the embodiment.

FIG. 4 is a diagram illustrating an example of servo data written in the short servo sector SSV of the embodiment. In this example, the servo mark, gray code, burst pattern #1, burst pattern #2, and additional code are written in the short servo sector SSV in this order in the write/read direction. In other words, the servo data written in the short servo sector SSV is different from the normal servo sector NSV in that the servo data includes an additional code instead of a post code.

When the servo data of the short servo sector SSV is demodulated, there is a case where the timing for demodulating the burst patterns #1 and #2 is deviated from the originally intended timing, and thus the demodulation position is largely deviated from the actual position, resulting in an unusual detection. The additional code is data for correcting the demodulation position obtained by the unusual detection. A detailed description of the timing for demodulating the burst patterns #1 and #2 written in the short servo sector SSV will be described below. The event that a demodulation position is obtained without any unusual detection may be hereinafter denoted as a phrase in which a demodulation position is normally obtained.

The post code for the short servo sector SSV may be written in a predetermined position away from the short servo sector SSV, for example, in a normal servo sector arranged one position before in the write/read direction. The RRO in the short servo sector SSV may be corrected by a post code written in the predetermined position.

The timing of demodulation of servo data of the embodiment will then be described with reference to FIGS. 5 and 6.

Figure 5:
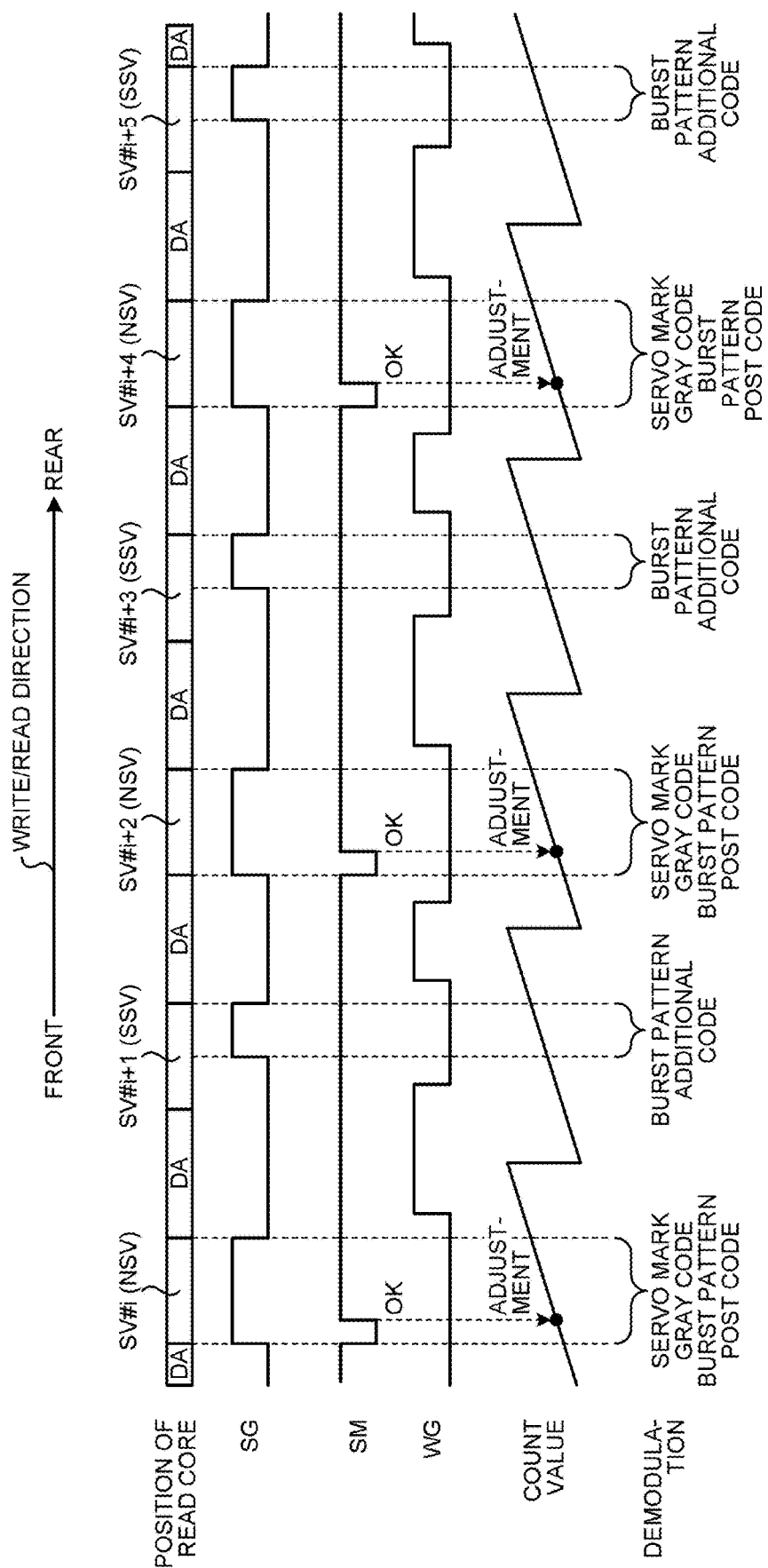
FIG. 5 is a schematic diagram for explaining waveforms of various signals relating to demodulation of servo data of the embodiment.

FIG. 5 is a schematic diagram for explaining waveforms of various signals relating to demodulation of servo data of the embodiment.

FIG. 5 depicts the position of the read core 22r in the circumferential direction. As an example, waveforms of various signals in a period in which the read core 22r passes through a servo sector SV #i, a servo sector SV #i+1, a servo sector SV #i+2, a servo sector SV #i+3, a servo sector SV #i+4, and a servo sector SV #i+5 in this order are displayed.

It is assumed that each of the servo sector SV #i, the servo sector SV #i+2, and the servo sector SV #i+4 is a normal servo sector NSV, and each of the servo sector SV #i+1, the servo sector SV #i+3, and the servo sector SV #i+5 is a short servo sector SSV.

FIG. 5 further depicts a waveform of a servo gate SG, a waveform of a servo mark detection signal SM, a waveform of a write gate WG, and the temporal transition of the count value of the counter 31. FIG. 5 also illustrates, for each servo sector SV, data to be demodulated among the servo data written in the servo sector SV.

The servo gate SG is a signal transmitted from the processor 26 to the RWC 25 and represents a period during which demodulation of servo data is permitted. In the example illustrated in FIG. 5, the "H" level of the servo gate SG represents that demodulation of servo data is permitted, and the "L" level of the servo gate SG represents that demodulation of servo data is not permitted. The RWC 25 demodulates the servo data during a period in which the servo gate SG is at the "H" level.

The write gate WG is a signal transmitted from the processor 26 to the head IC 24 and represents a period during which writing of data (more specifically, user data) is permitted. In the example illustrated in FIG. 5, the "H" level of the write gate WG represents that writing of data is permitted, and the "L" level of the write gate WG represents that writing of data is not permitted. The head IC 24 can write user data during a period in which the write gate WG is at the "H" level.

The servo gate SG and the write gate WG are controlled so that if one is at the "H" level, the other is not at the "H" level. In the case where the servo gate SG and the write gate WG are both at the "H" level due to some error, writing of data is prevented in hardware.

The servo mark detection signal SM is a signal indicating whether or not the servo mark is correctly detected. The servo mark detection signal SM is controlled, for example, by the RWC 25 or the processor 26. In the example illustrated in FIG. 5, the servo mark detection signal SM is basically maintained at the "H" level. If the servo mark is correctly detected when the read core 22r passes through the servo mark, the servo mark detection signal SM falls to the "L" level and immediately rises to the "H" level. If the servo mark cannot be correctly detected when the read core 22r passes through the servo mark, the servo mark detection signal SM falls to the "L" level and then is maintained at the "L" level until detection of the servo mark succeeds next time.

The failure to correctly detect servo marks can occur for a variety of reasons. For example, if the servo mark is defective due to a damage generated afterwards (i.e., a damage generated during the use of the magnetic disk device 1), and the servo mark cannot be read, the servo mark is not correctly detected. The reason why the servo mark cannot be correctly detected is not limited to the above reason.

As illustrated in FIG. 5, when the read core 22r passes through the normal servo sector NSV, the demodulation of the servo mark, gray code, burst patterns (i.e., burst pattern #1 and burst pattern #2), and post code is performed. When the read core 22r passes the short servo sector SSV, the demodulation of the burst patterns (i.e., burst pattern #1 and burst pattern #2) and the additional code is performed without being performed the demodulation of the servo mark.

If the servo mark written at the head of the normal servo sector NSV is correctly detected when the read core 22r passes through the normal servo sector NSV, the servo mark detection signal SM is temporarily transitioned to the "L" level and then immediately transitioned to the "H" level.

The timing at which the servo mark detection signal SM transitions from the "L" level to the "H" level is used as a reference for various operations. More specifically, the controller 30 (e.g., the processor 26) adjusts the count value of the counter 31 at the timing at which the servo mark detection signal SM transitions from the "L" level to the "H" level, and then determines the timing of various operations based on the count value of the counter 31 until the adjustment of the count value of the counter 31 is performed next time.

The count value of counter 31 may include an error. If adjustment of the count value of the counter 31 is not performed for a long period of time, the error of the count value of the counter 31 increases with time. If the error in the count value is greater than or equal to a predetermined level, the processor 26 is unable to control various operations at the correct timing as designed. In the embodiment, the normal servo sectors NSV are arranged every other sector in the circumferential direction. Therefore, as long as the servo mark is correctly detected in each normal servo sector NSV, the error of the count value of the counter 31 can be periodically canceled, thereby suppressing the error of the count value to a predetermined level or less.

Figure 6:
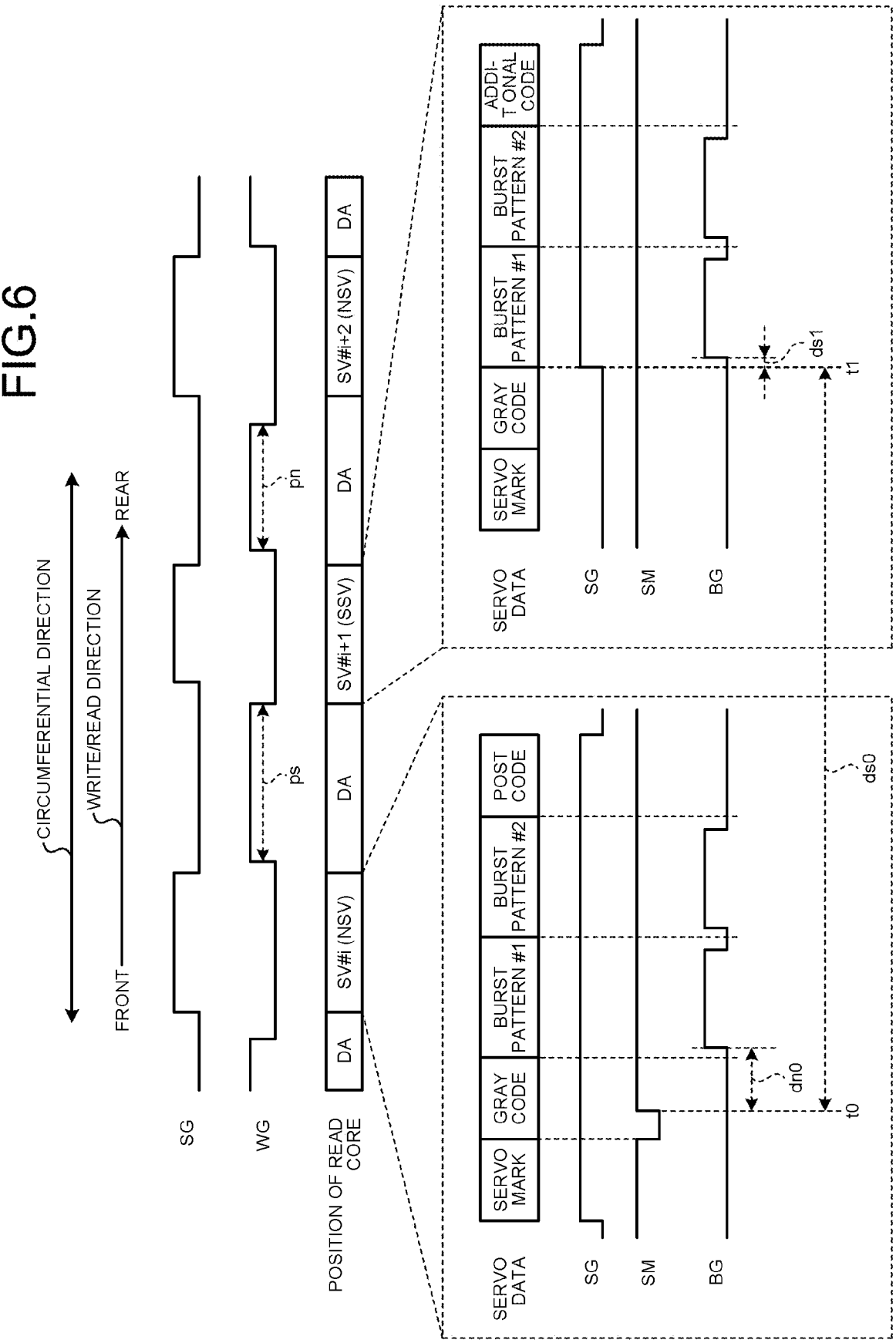
FIG. 6 is a schematic diagram for explaining details of waveforms of various signals when a read core passes through a servo sector.

FIG. 6 is a schematic diagram for explaining details of waveforms of various signals when the read core 22r passes through the servo sector SV. FIG. 6 depicts waveforms of a burst gate BG as examples of waveforms of various signals, in addition to the waveforms of the servo gate SG, the write gate WG, and the servo mark detection signal SM.

The burst gate BG is an internal signal of the RWC 25. The burst gate BG is a signal representing the timing at which the demodulation of the burst patterns (i.e., burst pattern #1 and burst pattern #2) is performed. In FIG. 6, the timing at which the burst gate BG rises from the "L" level to the "H" level represents the timing at which the burst pattern demodulation is started, and the timing at which the burst gate BG falls from the "H" level to the "L" level represents the timing at which the burst pattern demodulation is ended. The RWC 25 generates a burst gate BG, and performs demodulation of a burst pattern according to the generated burst gate BG.

The operation when the read core 22r passes through the normal servo sector NSV will be first described with reference to FIG. 6. FIG. 6 illustrates details of the servo sector SV #i as an example of the normal servo sector NSV.

When the read core 22r passes through the normal servo sector NSV, the servo gate SG is maintained at the "H" level during the period when the read core 22r passes through the normal servo sector NSV. The RWC 25 demodulates all of the servo mark, gray code, burst pattern #1, burst pattern #2, and post code from the normal servo sector NSV.

If the RWC 25 demodulates the servo mark when the read core 22r has passed through the servo mark, and the controller 30 (specifically, the RWC 25 or processor 26) has correctly detected the servo mark, the controller 30 lowers the servo mark detection signal SM and then immediately raises the servo mark detection signal SM. In order to demodulate the burst pattern, the RWC 25 then performs an operation of raising the burst gate BG, maintaining the burst gate BG at the "H" level for a predetermined period, and lowering the burst gate BG, at a timing at which a predetermined time dn0 has elapsed from the timing (timing t0 in FIG. 6) at which the servo mark detection signal SM is raised. The operation of raising the burst gate BG and maintaining the burst gate BG at the "H" level for a predetermined period and lowering the burst gate BG is performed for each of the burst pattern #1 and the burst pattern #2. In other words, this operation is performed twice in succession.

The positional relationship between the area where each burst pattern is written and the area where the servo mark is written and the number of rotations of the magnetic disk 11 are known. Therefore, the rising and falling timings of the burst gate BG are defined based on the falling timing of the servo mark detection signal SM. Further, the rising timing of the burst gate BG (i.e., the time dn0 based on the timing t0) and the falling timing of the burst gate BG are set so that a first period in which the burst gate BG is maintained at the "H" level is included in a period in which the read core 22r passes through the area where the burst pattern #1 is written. The rising timing of the burst gate BG and the falling timing of the burst gate BG are set so that a second period in which the burst gate BG is maintained at the "H" level is included in a period in which the read core 22r passes through the area where the burst pattern #2 is written. Therefore, the RWC 25 can demodulate the burst pattern #1 during the first period in which the burst gate BG is maintained at the "H" level, and can demodulate the burst pattern #2 during the second period in which the burst gate BG is maintained at the "H" level.

The operation when the read core 22r passes through the short servo sector SSV will then be described with reference to FIG. 6. FIG. 6 depicts the details of the servo sector SV #i+1 arranged immediately after the servo sector SV #i which is the normal servo sector NSV, as an example of the short servo sector SSV.

When the read core 22r passes through the short servo sector SSV, the servo gate SG is maintained at the "H" level during a part of the period in which the read core 22r passes through the short servo sector SSV. More specifically, the servo gate SG is maintained at the "H" level during the period in which the read core 22r passes through the area where the burst pattern #1 is written, the area where the burst pattern #2 is written, and the area where the additional code is written, and the servo gate SG is maintained at the "L" level during the other periods. Therefore, the RWC 25 demodulates the burst pattern #1, the burst pattern #2, and the additional code without demodulating either the servo mark or the gray code. In other words, when the read core 22r passes through the short servo sector SSV, the RWC 25 demodulates a smaller amount of servo data than when the read core 22r passes through the normal servo sector NSV.

The rising timing of the servo gate SG when the read core 22r passes through the short servo sector SSV is set based on the timing (i.e., the timing t0 in the example of FIG. 6) at which the servo mark is detected when the read core 22r passes through the normal servo sector NSV immediately forward. In the example illustrated in FIG. 6, the servo gate SG is raised from the "L" level to the "H" level at the timing t1 when a predetermined time ds0 has elapsed from the timing t0.

When the servo gate SG is raised, the RWC 25 performs an operation of raising the burst gate BG, maintaining the burst gate BG at the level of "H" for a predetermined period, and lowering the burst gate BG, at a timing at which a predetermined delay time ds1 has elapsed from a timing t1 when the servo mark detection signal SM is raised. The operation of raising the burst gate BG, maintaining the burst gate BG at the level of "H" for a predetermined period and lowering the burst gate BG is performed for each of the burst pattern #1 and the burst pattern #2 as in the case of reading and demodulating each burst pattern from the normal servo sector NSV. The rising timing of the burst gate BG and the falling timing of the burst gate BG are set so that a first period in which the burst gate BG is maintained at the "H" level is included in a period in which the read core 22r passes through the area where the burst pattern #1 is written. The rising timing of the burst gate BG and the falling timing of the burst gate BG are set so that a second period in which the burst gate BG is maintained at the "H" level is included in a period in which the read core 22r passes through the area where the burst pattern #2 is written. Therefore, the RWC 25 can demodulate the burst pattern #1 during the first period in which the burst gate BG is maintained at the "H" level, and can demodulate the burst pattern #2 during the second period in which the burst gate BG is maintained at the "H" level.

The time dn0, time ds0, and time ds1 are counted using the counter 31. The time ds0 here is longer than the time dn0 and the time ds1. Therefore, the accuracy of determining whether or not the time ds0 has elapsed is significantly affected by the error of the count value of the counter 31 as compared with the time dn0 and the time ds1. Therefore, when the read core 22r passes through the short servo sector SSV, the period during which the burst gate BG is maintained at the "H" level may exceed the period during which the read core 22r passes through the area where the corresponding burst pattern is written. In such a case, unusual detection of the demodulation position occurs. The demodulation position obtained by the unusual detection is corrected using an additional code demodulated next to the burst pattern #2.

The control of the write gate WG will then be described in detail. As described above, the servo gate SG and the write gate WG are basically controlled so that when one is at the "H" level, the other is basically at the "L" level. For the control of the servo gate SG and the write gate WG, it is further necessary to take into account the gap in the mounting position between the read core 22r and the write core 22w. The read core 22r and the write core 22w are mounted to the magnetic head 22 apart from each other. Therefore, the read core 22r may be moved relative to the magnetic disk 11 so as to precede the write core 22w in the write/read direction. In such a case, if the fall of the write gate WG and the rise of the servo gate SG is simultaneously performed at a timing at which the read core 22r approaches the head portion of the servo sector SV, both the servo gate SG and the write gate WG can be prevented from being at the "H" level. However, since the write core 22w is moved later in position than the read core 22r, an area where user data cannot be written occurs immediately before the servo sector SV.

In the case of the normal servo sector NSV, the servo gate SG can be raised at a timing at which the read core 22r approaches the head portion of the normal servo sector NSV. Therefore, in the case where the write core 22w is moved later in position than the read core 22r, an area where user data cannot be written occurs immediately before the normal servo sector NSV for the reason described above.

On the other hand, in the case of the short servo sector SSV, the servo gate SG can be raised at a timing at which the read core 22r crosses the boundary of the head portion of the short servo sector SSV and the read core 22r approaches the area where the burst pattern #1 is written. In other words, in the case of the short servo sector SSV, the timing at which the write gate WG falls can be made slower than that in the case of the normal servo sector NSV. As a result, the period during which the write gate WG is maintained at the "H" level when the read core 22r passes through the data area DA immediately before the short servo sector SSV (e.g., ps in FIG. 6) can be set to be longer than the period during which the write gate WG is maintained at the "H" level when the read core 22r passes through the data area DA immediately before the normal servo sector NSV (e.g., pn in FIG. 6). Thus, the area where user data cannot be written can be reduced.

The processor 26 determines the rising timing of the write gate WG based on the elapsed time from the falling timing of the servo gate SG. The processor 26 counts the elapse based on the count value of the counter 31. When a very short predetermined time elapses from the falling timing of the servo gate SG, the processor 26 raises the write gate WG. When a predetermined time (i.e., time pn or time ps) elapses from the rising timing of the write gate WG, the processor 26 then lowers the write gate WG. The processor 26 determines whether to use time pn or time ps based on whether the servo sector SV immediately rearward is the normal servo sector NSV or the short servo sector SSV.

The operation of detecting the servo mark and demodulating the burst pattern, such as the demodulation operation when the read core 22r passes through the normal servo sector NSV, is hereinafter denoted as normal demodulation. The operation of demodulating the burst data without detecting the servo mark, such as the demodulation operation when the read core 22r passes through the short servo sector SSV, is denoted as short demodulation.

As described above, the detection of the servo mark is used as a reference for various operations. Therefore, if the servo mark cannot be correctly detected, various operations are not controlled.

Figure 7:
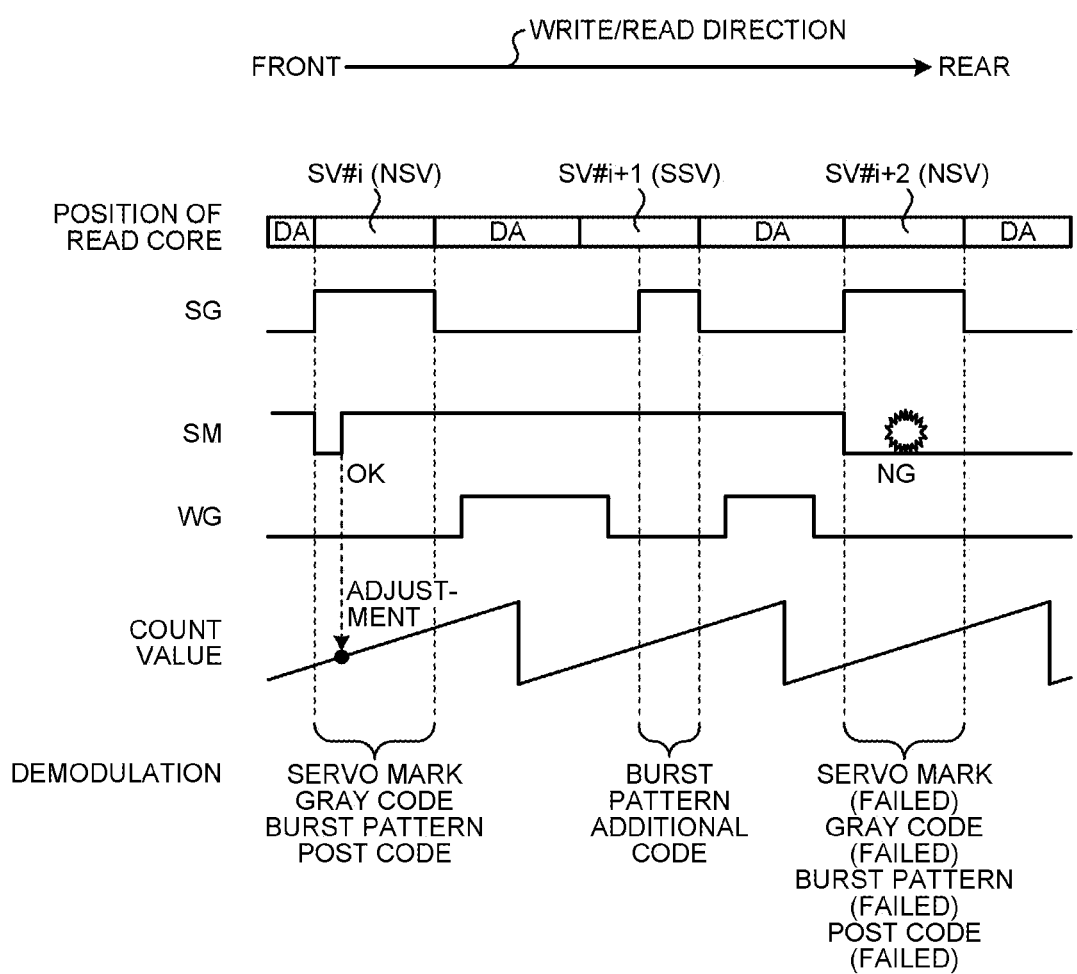
FIG. 7 is a schematic diagram illustrating the operation of the magnetic disk device of the embodiment when the read core passes through a normal servo sector where a defect exists in a servo mark.

For example, as illustrated in FIG. 7, if the servo mark of the servo sector SV #i+2, which is the normal servo sector NSV, cannot be correctly detected because a defect (denoted as an SM defect) exists in the servo mark, demodulation of the servo data (servo mark, gray code, burst pattern, and post code) of the servo sector SV #i+2 fails. In particular, the timing for starting the demodulation of the burst pattern of the servo sector SV #i+2 is defined as the timing at which a predetermined time (precisely, time dn0) has elapsed from the timing for detecting the servo mark of the servo sector SV #i+2. Therefore, in the example illustrated in FIG. 7, the burst pattern of the servo sector SV #i+2 cannot be demodulated, and as a result, acquisition of the demodulation position in the servo sector SV #i+2 fails and positioning accuracy is deteriorated.

The following servo sector SV #i+3 is a short servo sector SSV. In other words, the rising timing of the servo gate SG in the servo sector SV #i+3 is defined as the timing at which a predetermined time (precisely, time ds0) has elapsed from the timing at which the servo mark is detected in the servo sector SV #i+2. Therefore, if the servo mark cannot be correctly detected in the servo sector SV #i+2, the servo gate SG cannot be raised at an appropriate timing at which the read core 22r approaches the servo sector SV #i+3. As a result, the demodulation position cannot be acquired even in the servo sector SV #i+3, and the positioning accuracy is further deteriorated.

Therefore, in the embodiment, if a servo mark among servo data of a certain normal servo sector NSV cannot be correctly detected, the controller 30 changes the setting of the operation of demodulating the servo data of the normal servo sector NSV from normal demodulation to short demodulation. Thus, even if the servo mark SM cannot be correctly detected when the read core 22r passes through the normal servo sector NSV, the burst pattern written in the normal servo sector NSV can be demodulated. In other words, the demodulation position can be acquired even in the normal servo sector NSV in which the servo mark cannot be correctly detected, and deterioration of positioning accuracy is suppressed.

Figure 8:
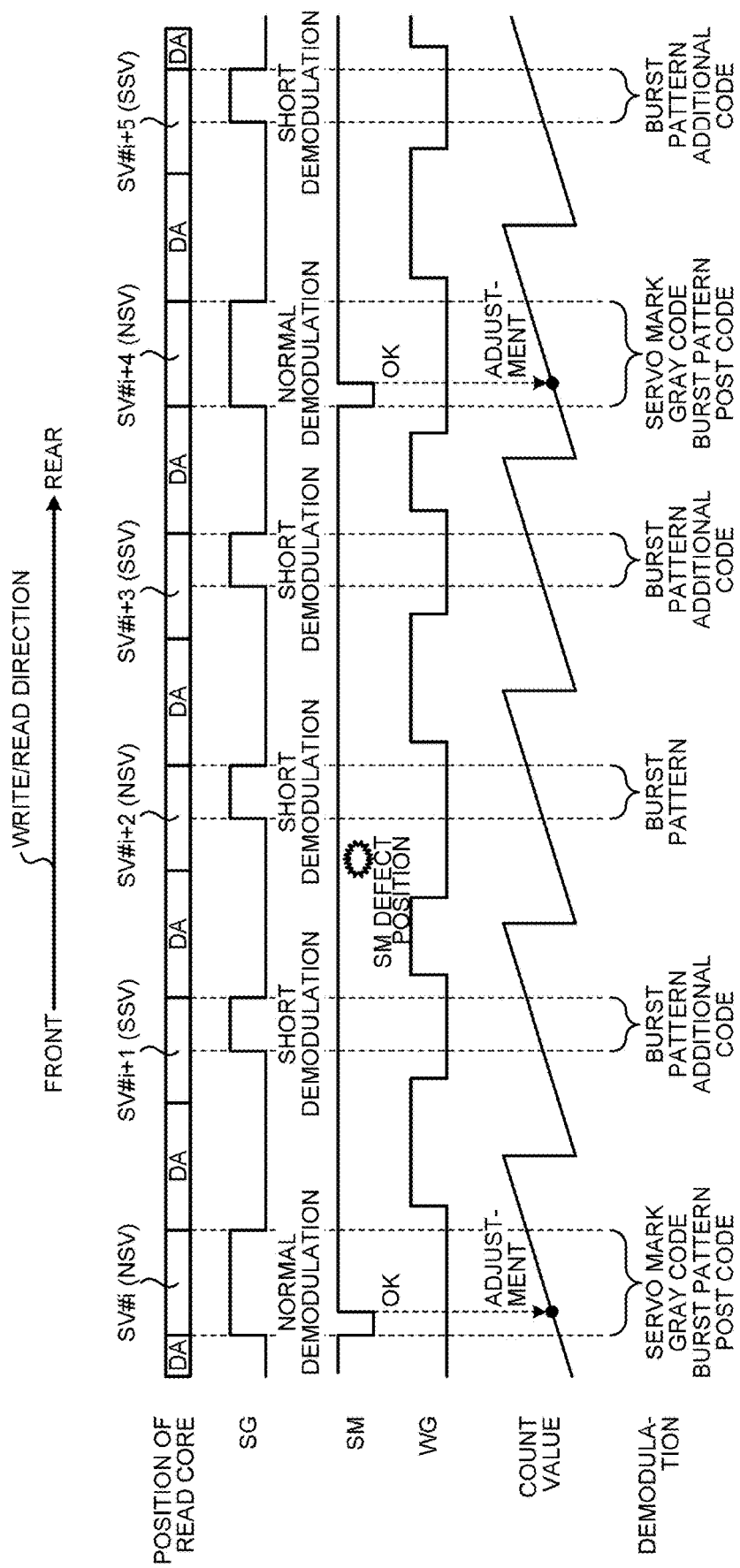
FIG. 8 is a schematic diagram illustrating a setting of a demodulation operation according to the embodiment for acquiring a demodulation position from a normal servo sector in the case where a defect exists in a servo mark of a servo sector SV #i+2 which is the normal servo sector.

For example, if the servo mark cannot be correctly detected when the read core 22r passes through the servo sector SV #i+2 which is the normal servo sector NSV, the controller 30 demodulates the servo data of the normal servo sector NSV by short demodulation as illustrated in FIG. 8. Thus, burst patterns (more precisely, burst pattern #1 and burst pattern #2) among the burst data of the servo sector SV #i+2 can be demodulated to acquire a demodulation position.

In the case where the operation of demodulating the servo data of the servo sector SV #i+2 is changed from normal demodulation to short demodulation, the controller 30 controls the demodulation operation of the servo marks of the servo sector SV #i+1 to the servo sector SV #i+3 based on the timing of detecting the servo mark of the servo sector SV #i corresponding to the normal servo sector NSV arranged in front of the servo sector SV #i+2.

Figure 9:
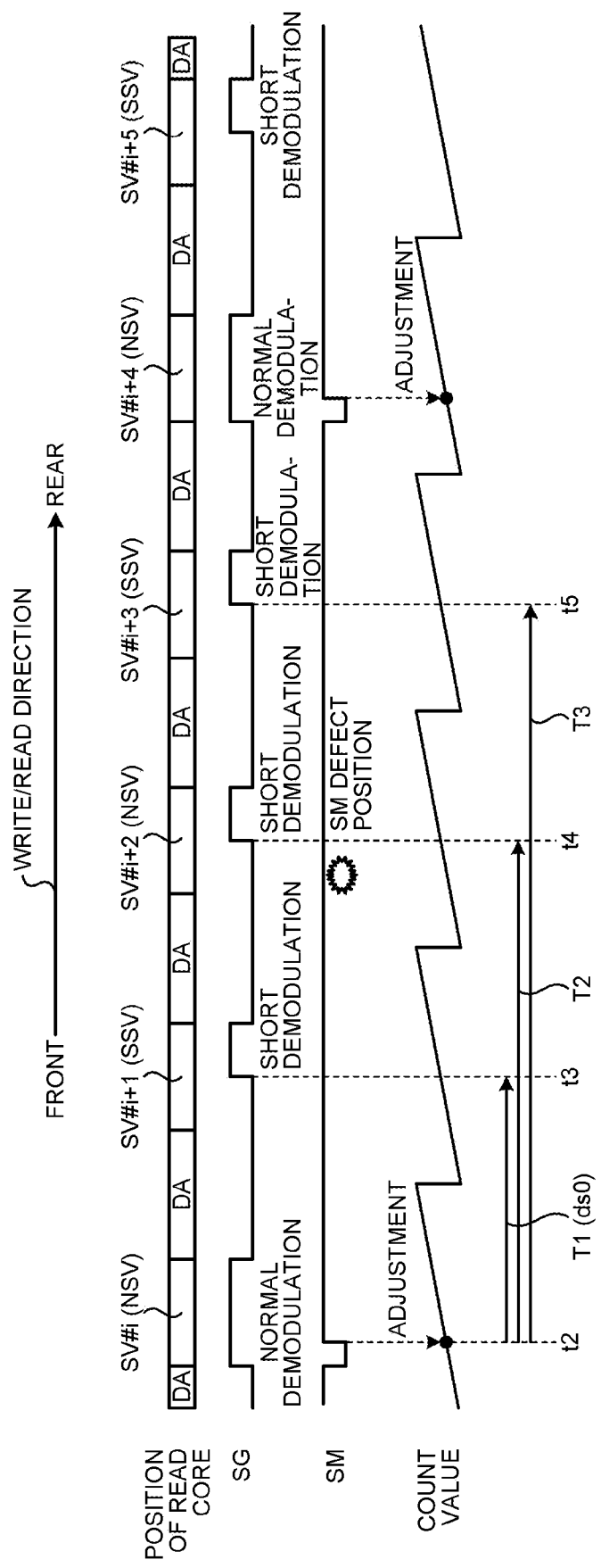
FIG. 9 is a schematic diagram for explaining timing control according to the embodiment in the case where the operation of demodulating the servo data of the servo sector SV #i+2 is changed from normal demodulation to short demodulation.

FIG. 9 is a schematic diagram for explaining timing control in the case where the setting of the operation of demodulating the servo data of the servo sector SV #i+2 by the magnetic disk device 1 is changed from normal demodulation to short demodulation in the embodiment.

The processor 26 determines the rising timing t3 of the servo gate SG for performing short demodulation of the servo data of the servo sector SV #i+1, which is the short servo sector SSV, based on the timing (timing t2 in FIG. 9) of detecting the servo mark of the servo sector SV #i. The processor 26 also determines the rising timing t4 of the servo gate SG for demodulating the servo data of the servo sector SV #i+2, which is the normal servo sector NSV, by short demodulation, based on the timing t2. The processor 26 also determines the rising timing t5 of the servo gate SG for demodulating the servo data of the servo sector SV #i+3, which is the short servo sector SSV, by short demodulation, based on the timing t2.

Time T1 from the timing t2 to the timing t3 is equal to the time ds0. Therefore, the processor 26 determines the timing t3 by counting the time T1 (i.e., the time ds0) elapsed from the timing t2 by using the counter 31. However, the processor 26 does not have prior information about either the time T2 from the timing t2 to the timing t4 or the time T3 from the timing t2 to the timing t5. Therefore, when the processor 26 changes the operation of demodulating the servo data of the servo sector SV #i+2 from normal demodulation to short demodulation, the processor acquires the time T2 and the time T3 by measurement.

Figure 10:
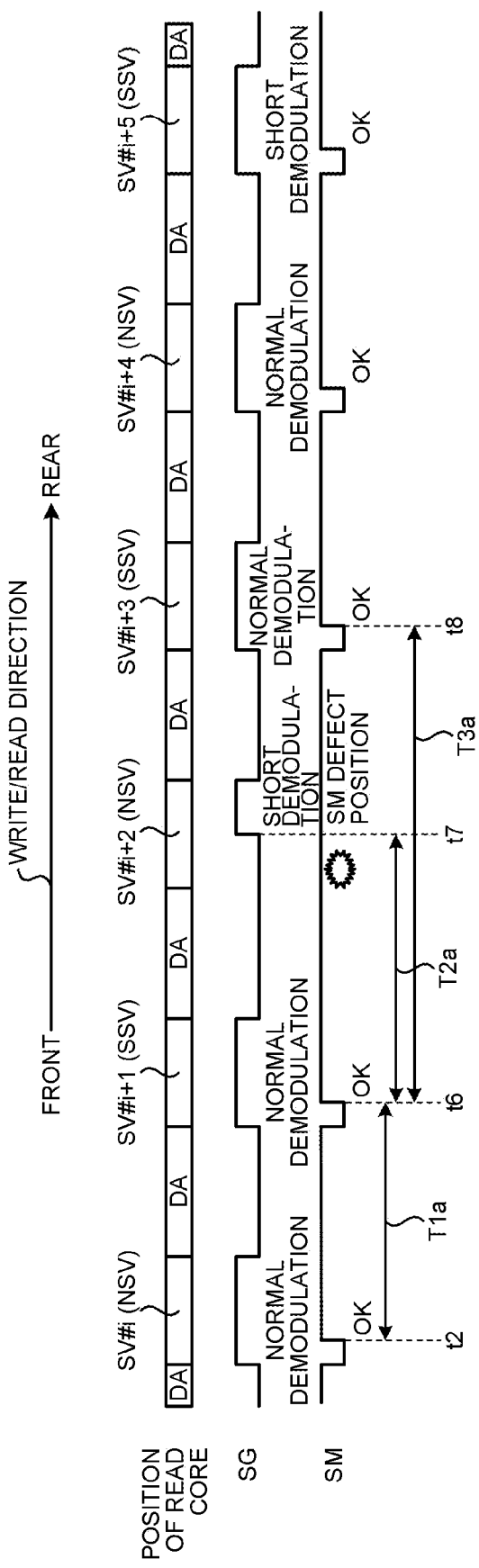
FIG. 10 is a schematic diagram for explaining the time measured to realize timing control according to the embodiment in the case where the operation of demodulating the servo data of the servo sector SV #i+2 is changed from normal demodulation to short demodulation.

In measuring the time T2 and the time T3, the processor 26 demodulates the servo data of the servo sector SV #i+1 by normal demodulation, demodulates the servo data of the servo sector SV #i+2 by short demodulation, and demodulates the servo data of the servo sector SV #i+3 by normal demodulation, as illustrated in FIG. 10. The processor then measures the time T1a from the timing t2 to the timing (timing t6 in FIG. 10) for detecting the servo mark of the servo sector SV #i+1, the time T2a from the timing t6 to the timing (timing t7 in FIG. 10) at which the burst pattern of the servo sector SV #i+2 can be demodulated, and the time T3a from the timing t6 to the timing (timing t8 in FIG. 10) for detecting the servo mark of the servo sector SV #i+3, by the counter 31. The processor then calculates the time T2 and the time T3 based on T1a, T2a, and T3a. The method of acquiring the time T2 and the time T3 will be described in detail in the description of the operation using FIGS. 11A and 11B.

Figure 11A:
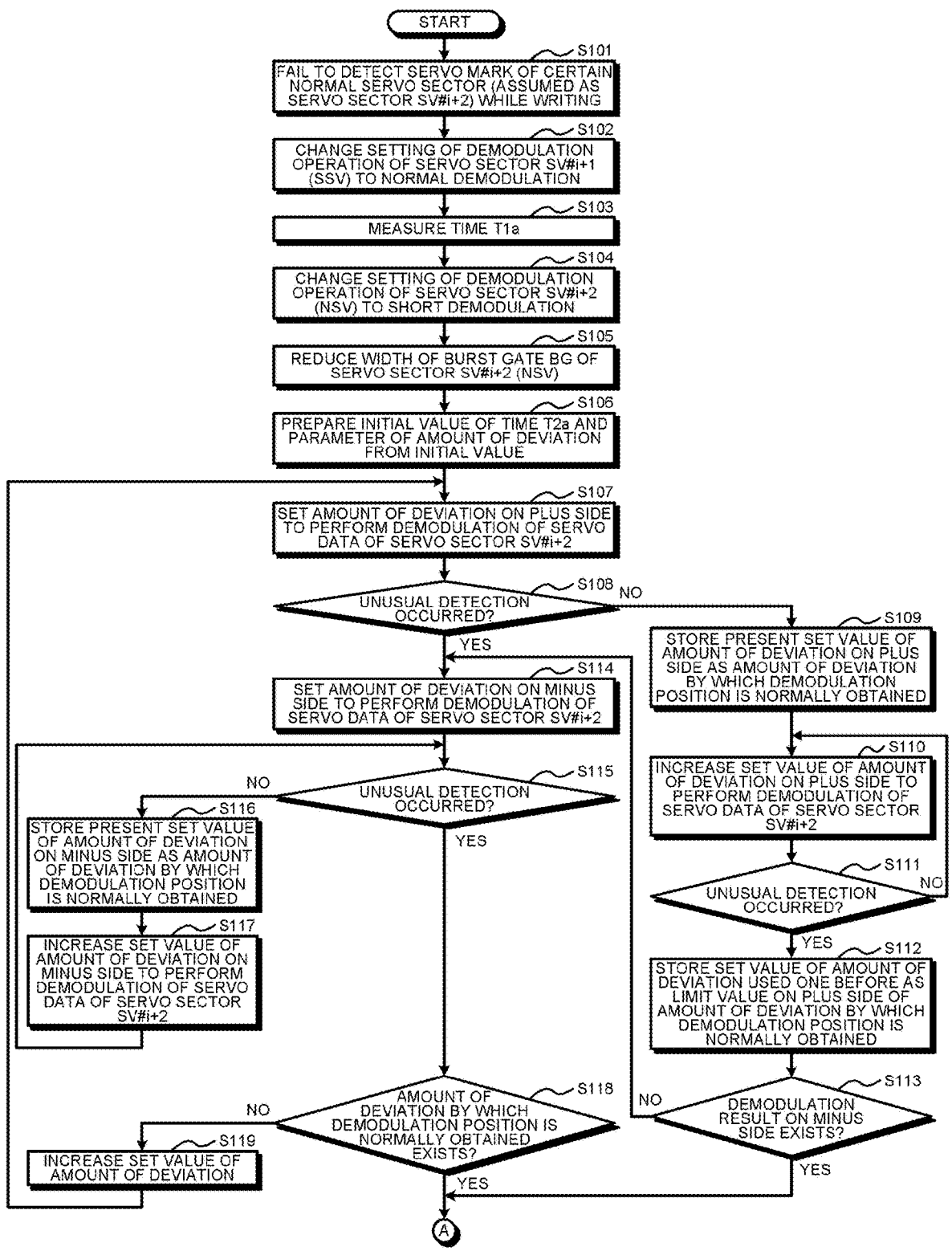
FIG. 11A is a flowchart illustrating the operation of the magnetic disk device of the embodiment.

FIGS. 11A and 11B are flowcharts illustrating the operation of the magnetic disk device 1 of the embodiment.

The controller 30 fails to detect the servo mark of a certain normal servo sector NSV while writing user data (S101). For ease of understanding, it is assumed that the normal servo sector NSV in which the detection of the servo mark has failed is the servo sector SV #i+2 illustrated as an example in FIGS. 7 to 10. The series of operations illustrated in this figure are similarly performed even if the detection of the servo mark of any normal servo sector NSV fails.

The controller 30 may detect the servo mark two or more predetermined times. For example, if the servo mark of the servo sector SV #i+2 cannot be correctly detected even once when the detection of the servo mark is performed a predetermined number of times, the controller 30 may determine that the detection of the servo mark of the servo sector SV #i+2 has failed.

Following S101, the controller 30 changes the setting of demodulation operation of the servo sector SV #i+1 from short demodulation to normal demodulation (S102). The controller 30 then demodulates the servo data of the servo sector SV #i which is the normal servo sector NSV arranged immediately before the servo sector SV #i+2 and the servo data of the servo sector SV #i+1 by normal demodulation, and measures the time T1a based on the count value of the counter 31 (S103). When normal demodulation is performed on the servo data of the servo sector SV #i which is the normal servo sector NSV, the controller 30 adjusts the count value of the counter 31 according to detection of the servo mark. In other words, the time T1a is measured based on the count value after the adjustment is performed.

The controller 30 then changes the setting of the demodulation operation of the servo sector SV #i+2 to short demodulation (S104). Further, the controller 30 reduces the width of the burst gate BG for demodulating the burst pattern of the servo sector SV #i+2 (S105).

Figure 12:
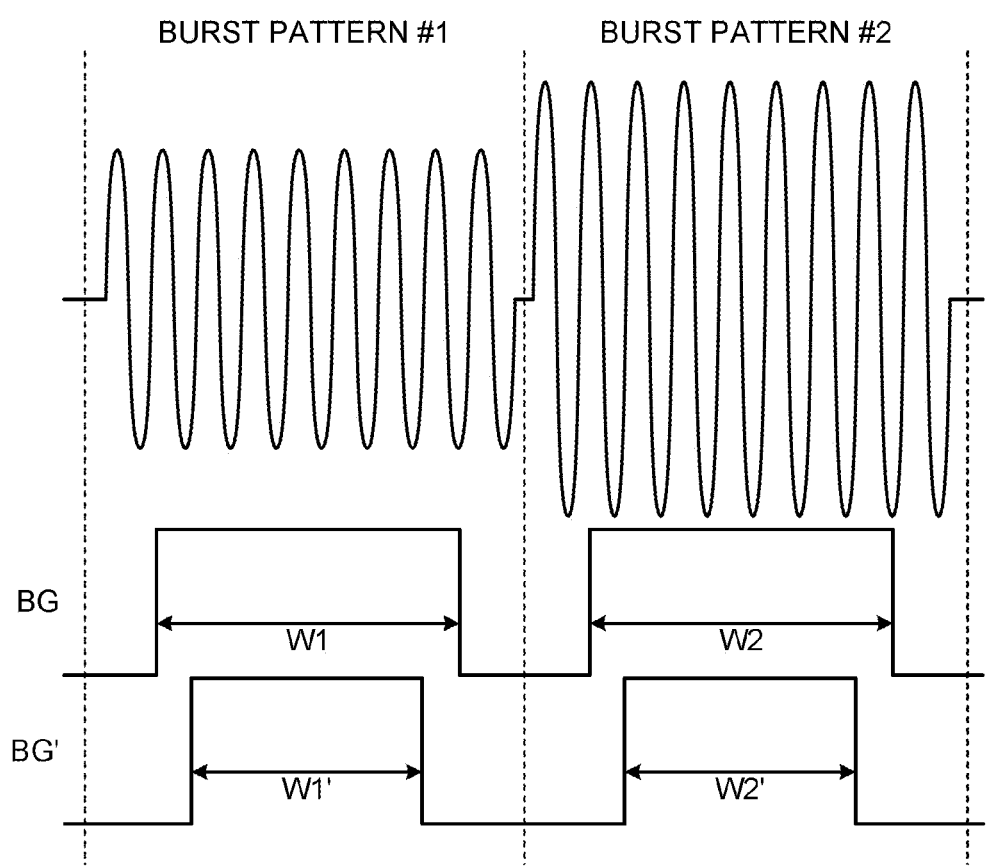
FIG. 12 is a schematic diagram for explaining a width of a burst gate of the embodiment.

FIG. 12 is a schematic diagram for explaining the width of the burst gate BG of the embodiment. In the case where unusual detection occurs when short demodulation is performed on the servo data of the short servo sector SSV, the demodulation position can be corrected by an additional code. However, the servo data of the normal servo sector NSV does not include additional codes. Therefore, in the case where unusual detection occurs when short demodulation is performed on the servo data of the normal servo sector NSV, the demodulation position cannot be corrected. In other words, the servo data of the normal servo sector NSV is less tolerant to the deviation of the demodulation timing than the servo data of the short servo sector SSV.

Therefore, in the embodiment, when the short demodulation is performed on the servo data of the normal servo sector NSV, the width of the burst gate BG is reduced compared with when the short demodulation is performed on the servo data of the short servo sector SSV.

In the example illustrated in FIG. 12, in the waveform of the burst gate BG when the short demodulation is performed on the servo data of the short servo sector SSV, the burst pattern #1 is demodulated in a period corresponding to a width W1, and the burst pattern #2 is demodulated in a period corresponding to a width W2. In the waveform of the burst gate BG (denoted as burst gate BG') when the short demodulation is performed on the servo data of the normal servo sector NSV, the width defining the period in which the burst pattern #1 is demodulated is reduced from W1 to W1' (where W1'<W1), and the width defining the period in which the burst pattern #2 is demodulated is reduced from W2 to W2' (where W2'<W2). The reduction of each of the widths improves the resistance to the deviation of the control timing of the burst gate BG.

In the process in S105 illustrated in FIG. 11A, in order to perform short demodulation on the servo data of the servo sector SV #i+2 which is the normal servo sector NSV, the controller 30 sets the RWC 25 to use the burst gate BG'.

The description returns to FIG. 11A.

Following S105, the controller 30 prepares an initial value of the time T2a and a parameter representing the amount of deviation from the initial value (S106).

In S107 to S119, the controller 30 attempts to demodulate the burst pattern of the servo sector SV #i+2 at a plurality of different timings around the timing at which the initial value of the time T2a has elapsed from the timing t6. The controller 30 then specifies the timing (e.g., timing t7) of performing the short demodulation at which a demodulation position is normally acquired based on the success or failure of the demodulation of the burst pattern of the servo sector SV #i+2. The above parameter representing the amount of deviation is a parameter for defining each of a plurality of different timings around the timing at which the initial value of the time T2a has elapsed from the timing t6.

The controller 30 first sets the amount of deviation on the plus side to perform demodulation of the servo data of the servo sector SV #i+2 (S107). In other words, the controller 30 performs short demodulation on the servo data of the servo sector SV #i+2. The RWC 25 uses a width reduced burst gate BG when short demodulation is performed on the servo data of the servo sector SV #i+2.

The controller 30 then determines whether or not unusual detection has occurred by demodulation of the servo data of the servo sector SV #i+2 (S108).

The method of determining whether or not unusual detection has occurred is not limited to a specific method. For example, the controller 30 calculates the difference between the demodulation position obtained by demodulating the servo data of the servo sector SV #i+1, which is the servo sector SV arranged immediately before the servo sector SV #i+2, and the demodulation position obtained by the process in S108. The difference is, for example, a difference in the radial position. As long as the magnetic head 22 is moved on the same track 41, the variation in the radial position of the magnetic head 22 when passing through two consecutive servo sectors SV is 0 or negligible. Therefore, it is possible to determine whether or not unusual detection has occurred by comparing the above difference with a predetermined threshold value. The controller 30 can determine that unusual detection has occurred when the difference exceeds a predetermined threshold value, and determine that unusual detection has not occurred when the difference does not exceed a predetermined threshold value. The process when the difference is equal to a predetermined threshold value is not limited to the above.

If it is determined that unusual detection has occurred (S108: Yes), the controller 30 performs the process in S114 to be described below.

If it is determined that unusual detection has not occurred (S108: No), the controller 30 stores the present set value of the amount of deviation on the plus side in a predetermined storage area as the amount of deviation by which a demodulation position is normally obtained (S109). The predetermined storage area is, for example, the RAM 27. The predetermined storage area is not limited to the RAM described above. The predetermined storage area may be the FROM 28.

The controller 30 then increases the set value of the amount of deviation on the plus side to perform demodulation of the servo data of the servo sector SV #i+2 (S110). The demodulation process of the servo data of the servo sector SV #i+2 in S110 is the same as that in S107.

As in S108, the controller 30 then determines whether or not unusual detection has occurred by demodulation of the servo data of the servo sector SV #i+2 (S111). If it is determined that no unusual detection has occurred (S111: No), the controller 30 performs the process in S110.

If it is determined that unusual detection has occurred (S111: Yes), the controller 30 stores the set value of the amount of deviation used one before in a predetermined storage area as a limit value on the plus side of the amount of deviation by which a demodulation position is normally obtained (S112). The controller 30 then determines whether or not the demodulation result on the minus side exists (S113).

If it is determined that the demodulation result on the minus side exists (S113: Yes), the controller 30 performs the process in S120 to be described below.

If it is determined that the demodulation result on the minus side does not exist (S113: No), the controller 30 sets the amount of deviation on the minus side to perform demodulation of the servo data of the servo sector SV #i+2 (S114). The demodulation process of the servo data of the servo sector SV #i+2 in S114 is the same as that in S107.

As in S108, the controller 30 then determines whether or not unusual detection has occurred by demodulation of the servo data of the servo sector SV #i+2 (S115). If it is determined that unusual detection has not occurred (S115: No), the controller 30 stores the present set value of the amount of deviation on the minus side in a predetermined storage area as the amount of deviation by which a demodulation position is normally obtained (S116).

The controller 30 then increases the set value of the amount of deviation on the minus side to perform demodulation of the servo data of the servo sector SV #i+2 (S117). The demodulation process of the servo data of the servo sector SV #i+2 in S117 is the same as that in S107. The controller 30 performs the process in S115 after the process in S117.

If it is determined that unusual detection has occurred (S115: Yes), the controller determines whether or not the amount of deviation by which a demodulation position is normally obtained exists based on the demodulation results obtained by the above processes (S118).

If it is determined that the amount of deviation by which a demodulation result is normally obtained does not exist (S118: No), the controller 30 increases the set value of the amount of deviation (S119), and performs the series of processes from S107 to S118 again. Thus, the range for searching the amount of deviation by which a demodulation result is normally obtained is expanded.

The description will be shifted to FIG. 11B.

If it is determined that the amount of deviation by which a demodulation result is normally obtained exists (S118: Yes), the controller 30 determines a value obtained by applying the center value of the range of the amount of deviation by which a demodulation position is normally obtained to the initial value as the time T2a (S120). The controller 30 then acquires the time T2 based on the sum of the time T1a and the time T2a (S121).

In S121, the controller 30 can set the sum of time T1a and time T2a as time T2. The method of acquiring the time T2 is not limited to the above method.

The time T2 represents the rising timing of the servo gate SG for performing short demodulation of the servo data of the servo sector SV #i+2. On the other hand, the time T2a represents the demodulation timing of the burst pattern of the servo sector SV #i+2. As illustrated in FIG. 6, the demodulation timing of the burst pattern is the timing at which the time ds1 has elapsed from the rising timing of the servo gate SG. Therefore, the controller 30 may set the value obtained by subtracting the time ds1 from the sum of the times T1a and T2a as the time T2.

The controller 30 then changes the setting of the demodulation operation of the servo sector SV #i+3, which is the short servo sector SSV, to normal demodulation (S122). The controller 30 then performs normal demodulation of the servo data of the servo sector SV #i, the servo data of the servo sector SV #i+2, and the servo data of the servo sector SV #i+3, thereby measuring the time T3a based on the count value of the counter 31 (S123). As in S103, when normal demodulation is performed on the servo data of the servo sector SV #i which is the normal servo sector NSV, the controller 30 adjusts the count value of the counter 31 according to detection of the servo mark. In other words, the time T3a is measured based on the count value adjusted when the servo mark of the servo sector SV #i is demodulated.

The controller 30 then acquires the time T3 based on the sum of the time T1a and the time T3a (S124).

The total time of the time T1a and the time T3a represents the timing t8, that is, the timing at which the servo mark of the servo sector SV #i+3 is correctly detected. In a case where normal demodulation is performed on the servo data of one servo sector SV, a minute time is known which is from the timing at which the servo mark detection signal SM rises to the timing at which the read core 22r approaches the area where the burst pattern is written. The controller 30 can acquire the time T3 from the timing t2, to the rising timing t5 of the servo gate SG for demodulating the servo data of the servo sector SV #i+3, by adding the minute time to the sum of the time T1a and the time T3a.

The controller 30 then changes the setting of the demodulation operation of the servo sector SV #i+1 and the setting of the demodulation operation of the servo sector SV #i+3 to the original setting, that is, to short demodulation (S125). The controller 30 then performs writing under control with the time T1, the time T2, and the time T3 (S126). In other words, in S126, the controller 30 controls the servo gate SG in the manner described with reference to FIG. 9 to perform writing. The sequence of operations ends.

As described above, if the controller 30 fails to detect the servo mark when normal demodulation is performed on the servo data written in a certain normal servo sector NSV, the controller performs short demodulation on the servo data written in the normal servo sector NSV.

Therefore, the demodulation position can be acquired even in the normal servo sector NSV in which the servo mark cannot be correctly detected, thereby suppressing the deterioration of the positioning accuracy of the magnetic head 22.

When normal demodulation is performed on the servo data written in each normal servo sector NSV, the controller 30 adjusts the count value of the counter 31 at the timing (e.g., timing t0 and timing t2) at which the servo mark is detected. As is apparent from, for example, FIGS. 6 and 9, the controller 30 determines the timing (e.g., timing t1, timing t3, timing t4, and timing t5) of the short demodulation based on the count value of the counter 31 during the period from the time when the count value of the counter 31 is adjusted to the time when the count value of the counter 31 is adjusted next time.

In particular, the controller 30 performs normal demodulation on the servo data written in the normal servo sector NSV (e.g., servo sector SV #i with respect to servo sector SV #i+2) arranged immediately before the normal servo sector NSV (e.g., servo sector SV #i+2), in which the servo mark cannot be correctly detected, in the write/read direction. The controller 30 adjusts the count value of the counter 31 at the timing (e.g., timing t2) at which the servo mark is detected in the normal demodulation. The timing is denoted as a first timing. The controller 30 determines the timing (e.g., timing t4) for performing short demodulation for the normal servo sector NSV (e.g., servo sector SV #i+2) in which the servo mark cannot be correctly detected, based on the count value of the counter 31 adjusted at the first timing.

Therefore, the short demodulation can be performed for the normal servo sector NSV in which the servo mark cannot be correctly detected.

The timing (e.g., timing t4) for being performed short demodulation for a normal servo sector NSV (e.g., servo sector SV #i+2) in which the servo mark cannot be correctly detected is denoted as a second timing.

The controller 30 performs normal demodulation on servo data written in the short servo sector SSV (e.g., servo sector SV #i+1 with respect to servo sector SV #i+2) arranged immediately before the normal servo sector NSV (e.g., servo sector SV #i+2), in which the servo mark cannot be correctly detected, in a write/read direction. The timing (e.g., timing t6) at which the servo mark is detected in the normal demodulation is denoted as a third timing. The controller 30 acquires a first time (e.g., time T1a) from the first timing to the third timing based on the count value of the counter 31 adjusted at the first timing (e.g., timing t2). The controller 30 attempts to perform short demodulation on the servo data written in the normal servo sector NSV (e.g., servo sector SV #i+2) in which the servo mark cannot be correctly detected, thereby acquiring a second time (e.g., time T2a) from the third timing to a timing (denoted as a fourth timing) at which short demodulation on the servo data written in the normal servo sector NSV succeeds, based on the count value of the counter 31 adjusted at the first timing. The controller 30 counts the elapse of time of the sum of the first time and the second time from the first timing based on the count value of the counter 31 adjusted at the first timing to determine the second timing.

Therefore, unusual detection can be prevented from occurring when short demodulation is performed on the normal servo sector NSV in which the servo mark cannot be correctly detected.

The controller 30 performs normal demodulation on servo data written in the short servo sector SSV (e.g., servo sector SV #i+3) arranged immediately after the normal servo sector NSV (e.g., servo sector SV #i+2), in which the servo mark cannot be correctly detected, in the write/read direction. The timing (e.g., timing t8) at which the servo mark is detected in the normal demodulation is denoted as a fifth timing. The controller 30 acquires the third time (e.g., time T3a) from the third timing (e.g., timing t6) to the fifth timing based on the count value of the counter 31 adjusted at the first timing (e.g., timing t2). The controller 30 then determines the timing for performing short demodulation on the servo data written in the short servo sector SSV (e.g., servo sector SV #i+3) arranged immediately after the normal servo sector NSV (e.g., servo sector SV #i+2), in which the servo mark cannot be correctly detected, in the write/read direction, by counting the elapse based on the sum of the first time and the third time based on the count value of the counter 31 adjusted at the first timing.

The controller 30 can obtain a demodulation position from the servo data of the short servo sector SSV (e.g., servo sector SV #i+3) by short demodulation on the servo data written in the short servo sector SSV arranged immediately after the normal servo sector NSV (e.g., servo sector SV #i+2), in which the servo mark cannot be correctly detected, in the write/read direction. As a result, the deterioration of the positioning accuracy of the magnetic head 22 is suppressed.

The controller 30 performs short demodulation on the servo data written in the normal servo sector NSV (e.g., servo sector SV #i+2) in which the servo mark cannot be correctly detected at a plurality of different timings to determine the success or failure of the demodulation of the burst pattern. The controller 30 then specifies the second timing based on the success or failure of the demodulation of the burst pattern.

Therefore, the controller 30 can specify the timing for performing short demodulation by which a demodulation position is normally obtained by the short demodulation for the normal servo sector NSV (e.g., the servo sector SV #i+2) in which the servo mark cannot be correctly detected, without depending on the detection of the servo mark of the normal servo sector NSV.

The controller 30 reduces the widths (e.g., W1 and W2) of the burst gate BG, that is, the demodulation period of the burst pattern, when short demodulation is performed for the normal servo sector NSV (e.g., servo sector SV #i+2) in which the servo mark cannot be correctly detected.

Thus, the resistance to the deviation of the demodulation timing can be improved when the burst pattern of the normal servo sector NSV is demodulated by short demodulation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk including a plurality of first servo sectors in which servo data including a servo mark and a burst pattern written in rear of the servo mark in a write/read direction along a circumferential direction is written, the plurality of first servo sectors being arranged at intervals in the circumferential direction, the plurality of first servo sectors including a plurality of second servo sectors, and a plurality of third servo sectors each arranged between two second servo sectors of the plurality of second servo sectors;
a magnetic head that performs data write/read in the write/read direction to the magnetic disk; and
a controller configured to
perform a first demodulation for detecting the servo mark and demodulating the burst pattern on the servo data written in each of the plurality of second servo sectors,
perform a second demodulation for demodulating the burst pattern without detecting the servo mark, on the servo data written in each of the plurality of third servo sectors, and
perform the second demodulation on the servo data written in a fourth servo sector which is one of the plurality of second servo sectors in a first case where detection of the servo mark fails when the first demodulation is performed on servo data written in the fourth servo sector.

2. The magnetic disk device according to claim 1, further comprising
a counter, wherein
the controller is configured to
adjust a count value of the counter at a timing at which the servo mark is detected in the first demodulation performed on the servo data written in each of the plurality of second servo sectors, and
perform the second demodulation at a predetermined timing based on a count value of the counter during a period from when the count value is adjusted to when the count value is adjusted next time.

3. The magnetic disk device according to claim 2, wherein,
the controller is configured to, in the first case, perform the first demodulation on the servo data written in a fifth servo sector, which is a second servo sector arranged immediately before the fourth servo sector in the write/read direction, among the plurality of second servo sectors, adjust a count value of the counter at a first timing at which the servo mark is detected, when the first demodulation is performed on the servo data written in the fifth servo sector, and determine a second timing at which the second demodulation is performed on the servo data written in the fourth servo sector, based on a count value of the counter adjusted at the first timing.

4. The magnetic disk device according to claim 3, wherein, the controller is configured to, in the first case, perform the first demodulation on the servo data written in a sixth servo sector, which is a third servo sector arranged immediately before the fourth servo sector in the write/read direction, among the plurality of third servo sectors, acquire a first time from the first timing to a third timing at which the servo mark is detected when the first demodulation is performed on the servo data written in the sixth servo sector, based on a count value of the counter adjusted at the first timing, acquire a second time from the third timing to a fourth timing at which the second demodulation on the servo data written in the fourth servo sector succeeds based on a count value of the counter adjusted at the first timing, by attempting the second demodulation on the servo data written in the fourth servo sector, and determine the second timing by counting elapse of a time of a sum of the first time and the second time from the first timing based on a count value of the counter adjusted at the first timing.

5. The magnetic disk device according to claim 4, wherein, the controller is configured to, in the first case, perform the first demodulation on the servo data written in a seventh servo sector, which is a third servo sector arranged immediately after the fourth servo sector in the write/read direction, among the plurality of third servo sectors, acquire a third time from the third timing to a fifth timing at which the servo mark is detected when the first demodulation is performed on the servo data written in the seventh servo sector based on a count value of the counter adjusted at the first timing, and determine a timing at which the second demodulation is performed on the servo data written in the seventh servo sector by counting elapse of a time based on a sum of the first time and the third time from the first timing based on a count value of the counter adjusted at the first timing.

6. The magnetic disk device according to claim 3, wherein, the controller is configured to, in the first case, perform demodulation of the burst pattern among the servo data written in the fourth servo sector at a plurality of different timings, determine a success or failure of the demodulation each time the burst pattern among the servo data written in the fourth servo sector is demodulated, and specify the second timing based on a result of determination of a success or failure of the demodulation.

7. The magnetic disk device according to claim 4, wherein, the controller is configured to, in the first case, perform demodulation of the burst pattern among the servo data written in the fourth servo sector at a plurality of different timings, determine a success or failure of the demodulation each time the burst pattern among the servo data written in the fourth servo sector is demodulated, and specify the second timing based on a result of determination of a success or failure of the demodulation.

8. The magnetic disk device according to claim 5, wherein, the controller is configured to, in the first case, perform demodulation of the burst pattern among the servo data written in the fourth servo sector at a plurality of different timings, determine a success or failure of the demodulation each time the burst pattern among the servo data written in the fourth servo sector is demodulated, and specify the second timing based on a result of determination of a success or failure of the demodulation.

9. The magnetic disk device according to claim 1, wherein the controller is configured to reduce a demodulation period of the burst pattern when the second demodulation is performed on the servo data written in the fourth servo sector.

10. The magnetic disk device according to claim 2, wherein the controller is configured to reduce a demodulation period of the burst pattern when the second demodulation is performed on the servo data written in the fourth servo sector.

11. A method of controlling a magnetic disk device including: a magnetic disk including a plurality of first servo sectors in which servo data including a servo mark and a burst pattern written in rear of the servo mark in a write/read direction along a circumferential direction is written, the plurality of first servo sectors being arranged at intervals in the circumferential direction, the plurality of first servo sectors including a plurality of second servo sectors, and a plurality of third servo sectors each arranged between two second servo sectors of the plurality of second servo sectors; and a magnetic head that performs data write/read in the write/read direction to the magnetic disk, the method comprising:

performing a first demodulation for detecting the servo mark and demodulating the burst pattern on the servo data written in each of the plurality of second servo sectors;

performing a second demodulation for demodulating the burst pattern without detecting the servo mark, on the servo data written in each of the plurality of third servo sectors; and performing the second demodulation on the servo data written in a fourth servo sector which is one of the plurality of second servo sectors in a first case where detection of the servo mark fails when the first demodulation is performed on servo data written in the fourth servo sector.

12. The method according to claim 11, further comprising:

adjusting a count value of a counter at a timing at which the servo mark is detected in the first demodulation performed on the servo data written in each of the plurality of second servo sectors; and performing the second demodulation at a predetermined timing based on a count value of the counter during a period from when the count value is adjusted to when the count value is adjusted next time.

13. The method according to claim 12, further comprising in the first case:
performing the first demodulation on the servo data written in a fifth servo sector, which is a second servo sector arranged immediately before the fourth servo sector in the write/read direction, among the plurality of second servo sectors;
adjusting a count value of the counter at a first timing at which the servo mark is detected, when the first demodulation is performed on the servo data written in the fifth servo sector; and
determining a second timing at which the second demodulation is performed on the servo data written in the fourth servo sector, based on a count value of the counter adjusted at the first timing.

14. The method according to claim 13, further comprising in the first case:
performing the first demodulation on the servo data written in a sixth servo sector, which is a third servo sector arranged immediately before the fourth servo sector in the write/read direction, among the plurality of third servo sectors;
acquiring a first time from the first timing, to a third timing at which the servo mark is detected when the first demodulation is performed on the servo data written in the sixth servo sector, based on a count value of the counter adjusted at the first timing;
acquiring a second time from the third timing to a fourth timing at which the second demodulation on the servo data written in the fourth servo sector succeeds based on a count value of the counter adjusted at the first timing, by attempting the second demodulation on the servo data written in the fourth servo sector; and
determining the second timing by counting elapse of a time of a sum of the first time and the second time from the first timing based on a count value of the counter adjusted at the first timing.

15. The method according to claim 14, further comprising in the first case:
performing the first demodulation on the servo data written in a seventh servo sector, which is a third servo sector arranged immediately after the fourth servo sector in the write/read direction, among the plurality of third servo sectors;
acquiring a third time from the third timing to a fifth timing at which the servo mark is detected when the first demodulation is performed on the servo data written in the seventh servo sector based on a count value of the counter adjusted at the first timing; and
determining a timing at which the second demodulation is performed on the servo data written in the seventh servo sector by counting elapse of a time based on a sum of the first time and the third time from the first timing based on a count value of the counter adjusted at the first timing.

16. The method according to claim 13, further comprising in the first case:
performing demodulation of the burst pattern among the servo data written in the fourth servo sector at a plurality of different timings;
determining a success or failure of the demodulation each time the burst pattern among the servo data written in the fourth servo sector is demodulated; and
specifying the second timing based on a result of determination of a success or failure of the demodulation.

17. The method according to claim 14, further comprising in the first case:
performing demodulation of the burst pattern among the servo data written in the fourth servo sector at a plurality of different timings;
determining a success or failure of the demodulation each time the burst pattern among the servo data written in the fourth servo sector is demodulated; and
specifying the second timing based on a result of determination of a success or failure of the demodulation.

18. The method according to claim 15, further comprising in the first case:
performing demodulation of the burst pattern among the servo data written in the fourth servo sector at a plurality of different timings;
determining a success or failure of the demodulation each time the burst pattern among the servo data written in the fourth servo sector is demodulated; and
specifying the second timing based on a result of determination of a success or failure of the demodulation.

19. The method according to claim 11, further comprising reducing a demodulation period of the burst pattern when the second demodulation is performed on the servo data written in the fourth servo sector.

20. The method according to claim 12, further comprising reducing a demodulation period of the burst pattern when the second demodulation is performed on the servo data written in the fourth servo sector.

* * * * *